Sept. 27, 1960

A. D. ROBBINS 2,953,960

OPTICAL SIGHTS HAVING HORIZON INDICATING MEANS

Filed July 7, 1955

INVENTOR.
Azor D. Robbins

BY

Moses, Nolte, Crews & Berry
ATTORNEYS

Sept. 27, 1960  A. D. ROBBINS  2,953,960
OPTICAL SIGHTS HAVING HORIZON INDICATING MEANS
Filed July 7, 1955  4 Sheets-Sheet 4

INVENTOR
Azor D. Robbins
BY
Moses, Nolte, Crews & Berry
ATTORNEYS

United States Patent Office 2,953,960
Patented Sept. 27, 1960

2,953,960

OPTICAL SIGHTS HAVING HORIZON INDICATING MEANS

Azor D. Robbins, Hempstead, N.Y., assignor to The W. L. Maxson Corporation, New York, N.Y., a corporation of New York Filed July 7, 1955, Ser. No. 520,419

3 Claims. (Cl. 88—1)

This invention relates to means for indicating the relation of the horizon to the transverse axis of an aircraft, and to optical sights for use on aircraft. In the latter aspect the invention is in the nature of an improvement upon the inventions disclosed in my prior Patents Nos. 2,492,888 and 2,645,150. The invention is particularly, although not exclusively, useful in single seater fighter aircraft because it simplifies the obligations imposed upon the single occupant of the craft.

In said prior patents provision is made of a combining glass through which the target may be seen and in which a relatively fixed reticle image is provided for bore-sighting together with an automatically controlled, movable, lead indicating reticle image.

It is a primary object of the present invention automatically to include in the sight, either separately or in combination with the fixed image at least, a reticle image representative of the horizon and constantly in coincidence therewith, the purpose being to aid the pilot in the management of the aircraft under conditions when the true horizon is not visible through the combining glass. For the purpose of more clearly indicating the attitude of the plane relative to the horizon, the fixed reticle image (fixed with relation to the aircraft) is made to include not only the crossed lines indicative respectively of the directions of the vertical and transverse axes of the aircraft, but also prolongation segments of the latter line.

To this end it is a feature that a movable artificial horizon reticle is provided together with operating means adapted to turn the movable reticle relative to the fixed reticle for indicating the bank of the aircraft, and to move the movable reticle bodily up and down relative the fixed reticle lines as the aircraft noses up or down. The new movable reticle is, like the fixed and lead reticle, mounted at substantially the focal distance from the collimating system, so that all the reticle images are seen as if located at infinity. As a consequence, all the reticle images shift equally in the combining glass with movement of the pilot's head, being unaffected in their positions relative to the pilot's eye and relative to one another by such movement of the pilot's head.

It is a further feature that control means for the artificial horizon reticle is provided comprising two driven shafts capable of affecting the artificial horizon reticle either independently or in combination.

It is still another feature that remote mechanism is provided which automatically transmits to one of the actuating shafts for the horizon reticle a rotation corresponding in amount to the relative rotation which would occur about a fore and aft horizontal axis between the aircraft and a fixed horizontal plane as an incident of banking, and which automatically transmits to the other of the actuating shafts for the horizon reticle a rotation corresponding in amount to the relative rotation which would occur about a transverse horizontal axis between the aircraft and the true horizon as an incident of nosing up or down.

A further object is to modify the former construction of the sight in such a way that the artificial horizon reticle can be disposed to move bodily up and down and to turn about a horizontal axis, so that it may be counter-weighted to make it free from bias.

Still another object is to reduce the height of the sight unit, in order to adapt it more advantageously for use in modern fighter aircraft.

Other objects and advantages will hereinafter appear.

In the drawing forming part of this specification:

Fig. 1A is a detail view of the mechanism for operating the artificial horizon reticle.

Figure 1:
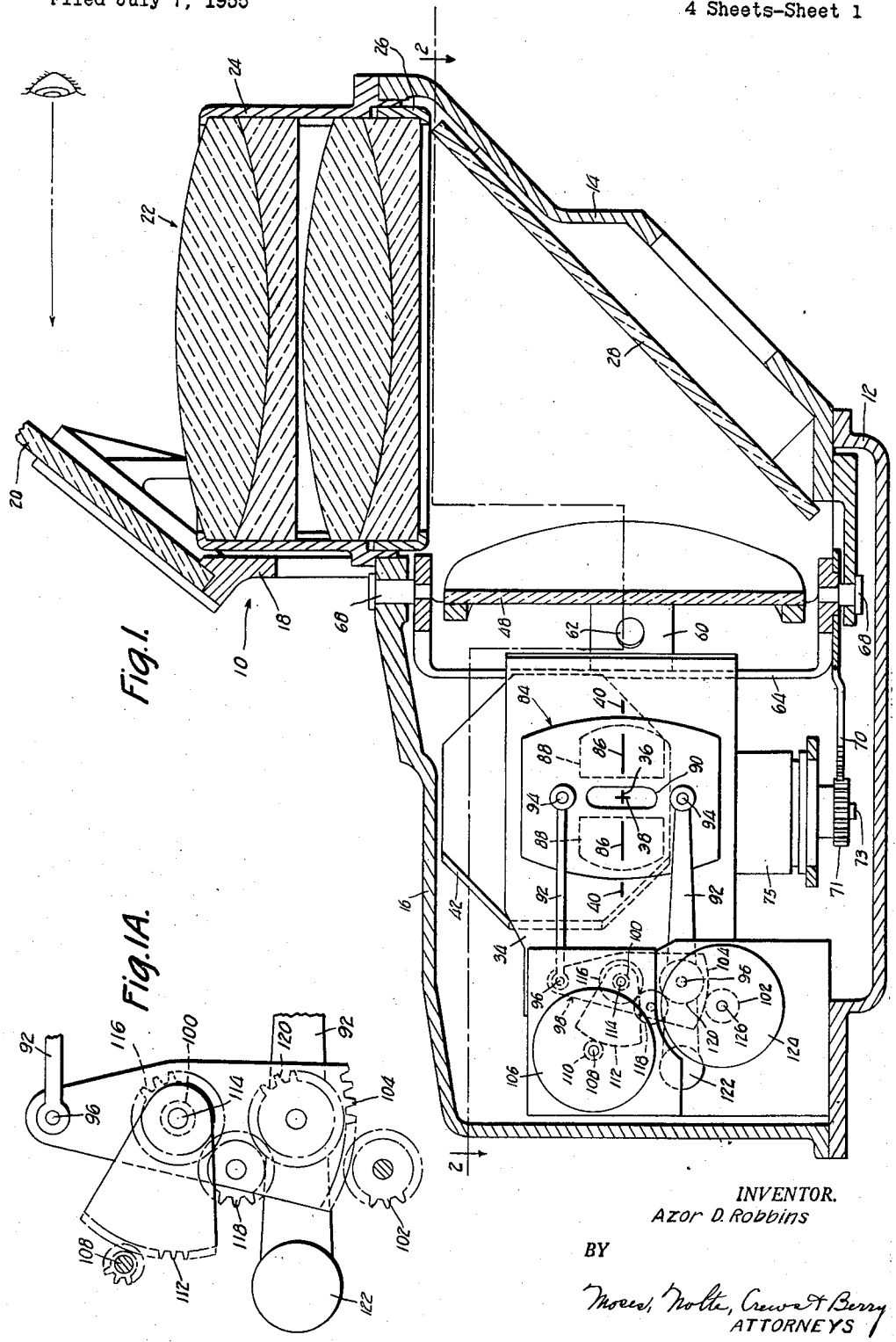
Fig. 1 is a sectional view in side elevation of an optical sight unit embodying features of the invention.

The sight unit 10 includes a housing which consists chiefly of a base member 12 and wall members 14 and 16. An upstanding bracket 18, secured to the frame, supports a plane combining glass 20 at an inclination of 45 degrees. A collimating system 22 of lenses is contained in a casing composed of complementary, flanged tubular members 24 and 26, the casing being so mounted in fixed position on the frame that the optical axis of the collimating system is caused to extend vertically. A plane mirror 28 is supported beneath the lenses in parallel relation to the combining glass 20.

Figure 2:
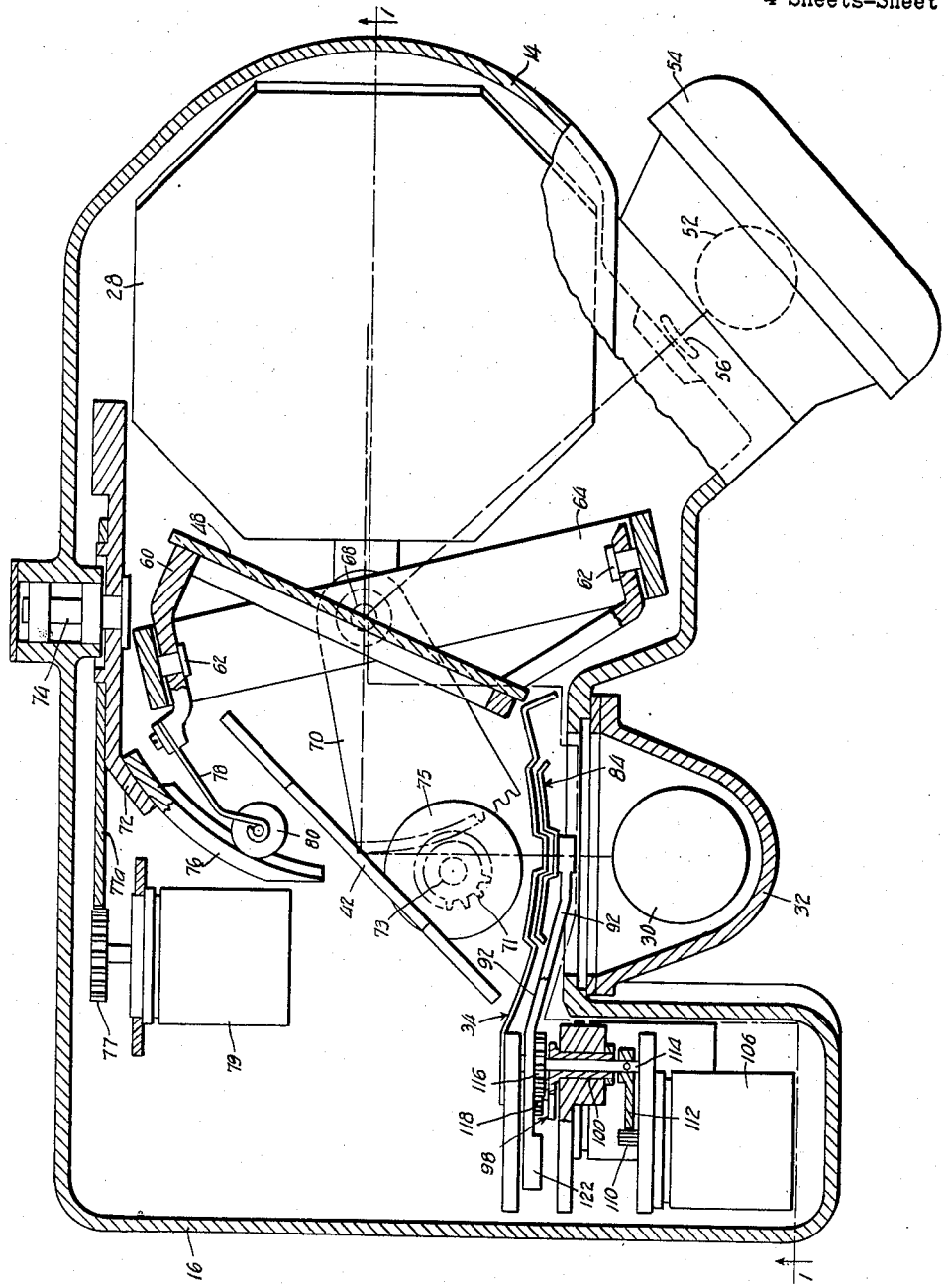
Fig. 2 is a sectional view taken on the line 2—2 of Fig. 1, looking in the direction of the arrows.

An electric lamp 30 (Fig. 2) is disposed in a recess formed by a reflector extension 32 of the housing, in position to have its light shine through slots formed in a stationary reticle 34. The reticle 34 (Fig. 3) is formed with crossed horizontal and vertical slots 36 and 38 and with additional horizontal slots 40 which are disposed in alignment with the slot 36. The light from the lamp 30 travels from the lamp through the slots 36, 38 and 40 to a vertical mirror 42 which is fixed at an angle of 45 degrees to the vertical plane which contains the fore and aft axis of the sight. The light is reflected by the mirror 42, passing through a semi-transparent mirror 48 to the mirror 28. The light is reflected by the mirror 28 through the collimating system. These rays are reflected by the combining glass 20 to the eye of the observer. The optical distance of the reticle 34 from the collimating system is so chosen that the rays emerging from the collimating system will all be parallel, causing the images of the light slots 36, 38 and 40 to appear as if at infinity in the combining glass.

A second lamp 52 (Fig. 2) located in a further casing extension 54 is disposed to project its light through a lead indicating reticle 56 upon the semi-transparent mirror 48 for reflection by the mirror 48 to the mirror 28. The reticle 56 is formed with a nearly circular slot through which the light may pass. The light from the lamp 52 is reflected upward by the mirror 28 through the collimating system and, like the light from the lamp 30, it emerges as parallel rays, the reticle 56 being located at the same optical distance from the collimating system as the reticle 34. The emergent light is reflected to the observer by the combining glass in the form of parallel rays, so that the circular reticle image 58 (Fig. 3) also caused to appear at infinity.

Although the reticle 56 is stationary, the reticle image 58 may be moved either horizontally or vertically or both horizontally and vertically relative to the fixed images of the crossed lines 36 and 38, as in my prior patents hereinbefore referred to. This is done through automatic turning of the semi-transparent mirror 48 to vary the angles of incidence and reflection relative to the mirror 48. The mirror 48 is mounted on a frame 60 which is rotatively supported on bearing pins 62 carried by a gimbal ring 64. The gimbal ring 64 is rotatively supported by vertically aligned stationary bearings 68 carried by the housing.

It will be seen that light projected through the opening of reticle 56 will be reflected by the mirror 48 through the collimating system 22. In the normal position of the mirror the light will be reflected through the center of the collimating system.

Figure 3:
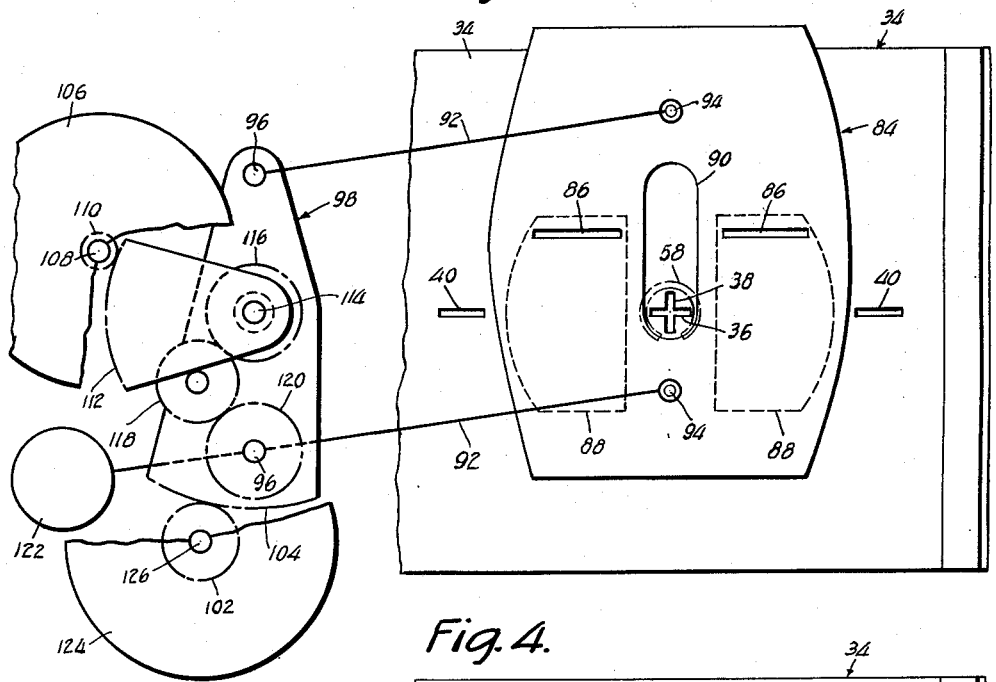
Figs. 3 and 4 are views showing the artificial horizon reticle and its operating mechanism in different operated positions.

The reflected light may, however, be moved in relation to the collimating system by turning the mirror 48, this being accomplished either by turning the gimbal ring 64 on its pivots 68, or by turning the mirror frame on its pivots 62, or by a combination of the two turning movements. With the mirror 48 in the center of its angular travels the reticle image 58 is caused to appear in surrounding relation to the cross formed by the lines 36, 38 as shown in Fig. 3. Turning the glass 48 by moving the gimbal ring 64 on its pivots causes the image to move to the right or left. Turning the frame 60 on the pivots 62 causes the image to move up or down.

To rotate the gimbal ring on its pivots a toothed segment 70 is attached to the bottom of the gimbal ring. This segment is driven by gear 71 fast on the output shaft 73 of a servo motor 75.

To rotate the frame 60 on its pivots 62 in the gimbal, an arm 72 is mounted on a shaft 74 positioned at the opposite side of the housing from the reticle 56. The shaft 74 is supported to have its axis intersect the axes of the gimbal pivots 68 and the frame pivots 62 at the intersections of said axes with one another. The arm 72 carries a finger 76 having arcuate surfaces whose center coincides with the centers of the gimbal pivots. The frame 60 carries a flat leaf spring 78, upon the outer or free end of which a grooved roller 80 is rotatively mounted. The roller 80 partially embraces the finger 76 whose surfaces fit the V-shaped peripheral groove of the roller.

The spring 78 causes the roller to press firmly against the surface of the finger 76. When the gimbal is turned on its pivots the spring 78 provides a yieldable arm to carry the roller 80 along the arcuate surfaces of the finger 76 but, in any position of the gimbal ring, rotation of the arm 72 is transmitted through the finger 76, roller 80 and spring 78 to rotate the frame 60 about the axis of the pivots 62. The arm 72 is driven through a gear 77 and segment 77a by servo mechanism 79.

As thus far described in detail, the present illustrative mechanism fully embodies the principle of the invention disclosed in Patent No. 2,645,150, and differs from the disclosure of said patent primarily in the fact that an additional mirror 28 is provided which permits and requires certain of the parts to be mounted in different attitudes and locations from those of the corresponding parts in the patent. This is advantageous because it enables the sight unit to be made of less height than formerly. There is the further difference that the stationary slots 40 are provided.

In accordance with the primary feature of the present invention, provision is made for also providing an artificial horizon image in the combining glass 20. Before proceeding with the description of this feature, it should be noted that the terms "horizontal" and "vertical" as used in the description up to this point have been used in a purely relative sense and on the assumption that the sight stands in the attitude illustrated in the drawing. In actual practice, of course, the sight is fixedly supported on the aircraft, so that it pitches and rolls in unison with the aircraft. With reference to the reticle image representative of the artificial horizon, however, the term "horizontal" is used in an absolute sense.

A movable reticle 84 (Figs. 1 and 2) is interposed between the lamp 30 and the fixed mirror 42. The reticle 84 is provided with two slots 86 in alignment with one another, which slots invariably produce horizontal images in the combining glass 20, even though the instrument as a whole, mounted in a fixed relation with the aircraft, participates in the pitch and roll of the aircraft. The reticle is disposed between the lamp 30 and the reticle 34 so that each reticle could cut off light transmitted through the slots of the other if suitable cut-outs were not provided. The reticle 34 is accordingly provided with cut-outs 88 to avoid obstructing light which passes through the slots 86 in any operated position of the reticle 84, and the reticle 84 is provided with a cut-out 90 to avoid obstructing light which passes through the slots 36 and 38 in any operated position of the reticle 84.

Since the optical distances from the slots 86 to the collimating system should be the same as the optical distances from the slots 36, 38 and 40 to the collimating system, it is important that the slots 86 lie in the same plane with the slots 36, 38 and 40. The slots 36, 38 and 40 are formed in the curved body plane of the reticle 34, and the main body of the reticle 34 lies behind that plane, but in the same areas where the slots 86 are formed in the reticle 84, and where the cut-outs 88 are provided in the reticle 34, the reticle 86 is offset to lie in the body plane of the reticle 34.

The optical path of the light passing through the slots 86 is the same as that described for the slots 36, 38 and 40, so that the images of the slots 86 appear in the combining glass 20 along with the images of the slots 36, 38 and 40 and with the movable reticle image 58.

The movable reticle 84 is supported by parallel arms 92 which are connected by pivots 94 to the reticle. The points of pivotal connection are equi-distant from the line in which the slots 86 lie. The arms are also connected by pivots 96 to a pivotally mounted segment lever 98. The pivoted arms 92 form opposite sides of a parallelogram. When one of them is rocked about its pivot 96 the other one is compelled to rock in parallel relation with it, and the reticle 84 is moved almost straight up (Fig. 3) or straight down without itself being tilted at all.

The segment lever 98 is rotatively mounted on a hollow shaft 100 which may be a fixed shaft and whose axis is equi-distant from the upper and lower pivots 96, but is normally held against rotation about the axis of the shaft by a gear 102 which meshes with the teeth 104 (Fig. 1A) of the segment. A servo motor 106, which is adapted to drive its output shaft 108 in either of two opposite directions, is connected through a pinion 110, and a segment 112 to drive a shaft 114 which extends through the shaft 100. The shaft 114 has fast upon it a gear 116 which, through an idler gear 18 rotatively mounted on the segment lever 98, drives a gear 20 fast with the lower arm 92 and concentric with the lower pivot 96.

In Fig. 1, the parts are shown in a normal condition, in which the aircraft is pointed toward the horizon and is not banked. The slots 86 are in alignment with the slots 36 and 40, and are at right angles to the slot 38.

Counterclockwise rotation of the gear 116 will carry the reticle 84 to the position illustrated in Fig. 3 with the slots 86 still parallel to the slots 38 and 40 but located above them. This is the condition which would be automatically produced when the aircraft is pointed below the horizon to a definite angular extent. The reticle images as seen in the combining glass would correspond in relative position with the slots 36, 38, 40 and 86 by which they are produced. To an observer, it would appear that the images of 36, 38 and 40 had not been changed because they, like the observer, remain in fixed relation to the aircraft, but it would appear that the reticle images representing the horizon had been shifted. The true situation would be understood however by looking upon the images of 86 as horizon images which remain fixed, and recognizing the fact that the other images have shifted to indicate the new direction in which the plane is pointed relative to the fixed horizon. The reticle 84 can be moved an equal distance downward relative to the stationary reticle 34 by driving the gear 116 in a clockwise direction.

Since the servo motor 106 is a follow-up device, it is an important point that the reticle 84 and its carrying arms are vertically movable and are counterbalanced by a weight 122 on the lower arm 92. By this arrangement, the reticle and its operating mechanism are made free from bias, and therefore equally responsive in both directions and in all positions to the light follow-up force exerted by the servo motor 106. The complete counterbalancing of the reticle and its carrying arms renders it immune to sudden shocks or to acceleration which may be applied to the aircraft.

Figure 4:
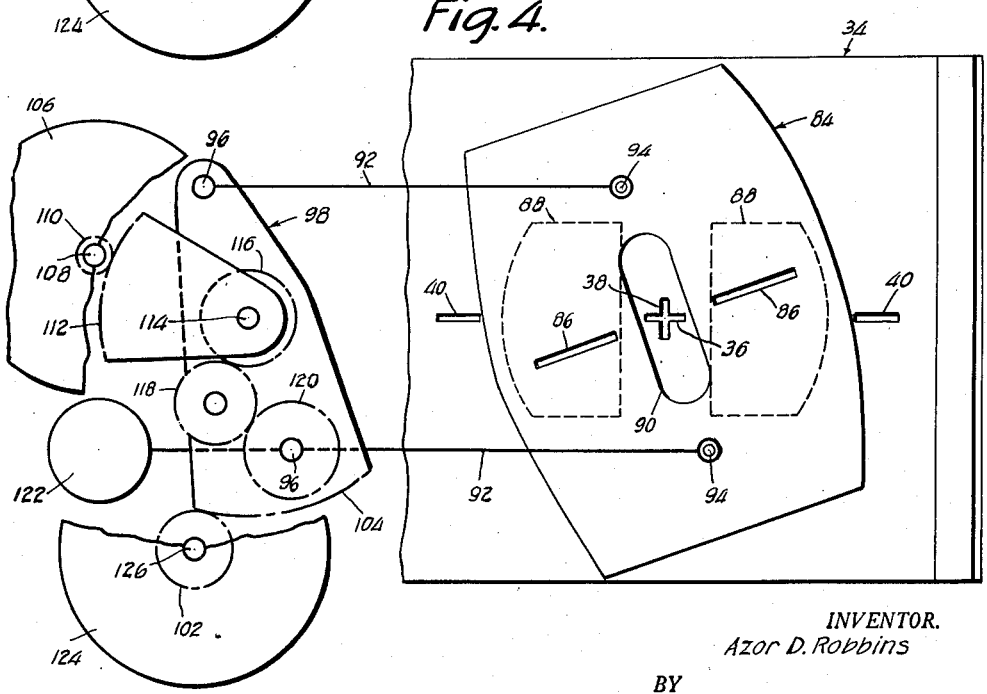

When the aircraft is not changing the slope of its path, the gear 116 remains stationary. Again it may be assumed that the parts are initially in the positions illustrated in Fig. 1, with the pivots 94 and 96 defining the four corners of a rectangle. As the aircraft is banked, a servo motor 124 is automatically actuated to turn its output shaft 126 in one direction or the other according to the direction of banking. The shaft 126 is caused to turn the pinion 102 and thereby to rotate the segment lever 98 about the axis of the shaft 114. The effect of clockwise rotation of the gear 102 is illustrated in Fig. 4. The segment lever 98 is rocked counterclockwise, as shown. During this action the arms 92 are moved bodily but do not change their angular disposition. The result is that the reticle 84 is rocked about the mid-point of the line which joins its upper and lower pivots 94. This is true because the now stationary gear 116 and the planetary gear 120 are equal gears. Whatever the angle through which the segment lever 98 is turned in one direction the gear 120 is automatically turned through an equal angle in the opposite direction relative to the segment lever, so that it does not change its absolute rotary position. As a result of this arrangement, rocking of the segment lever 98 does not produce any bodily movement of the reticle 84 but simply causes the reticle 84 to be rocked in unison with the segment lever 98 about the midpoint of the line which joins the upper and lower pivots 94. Banking to the right to a definite degree will produce the condition illustrated in Fig. 4. The slots 86 have been rocked to the left about the mid-point of the line 94—94 as a center to the extent of the right bank, while the slots 36, 38 and 40 have retained their original position relative to the aircraft. The images of the slots 86, however, remained unchanged in direction in the combining glass, while the images of the slots 36, 38 and 40 are tilted to the right in harmony with the banking of the aircraft.

The two servo motors 106 and 124 may, of course, act simultaneously upon the reticle 84, in response to simultaneous changes of the controlling conditions.

Figure 6:
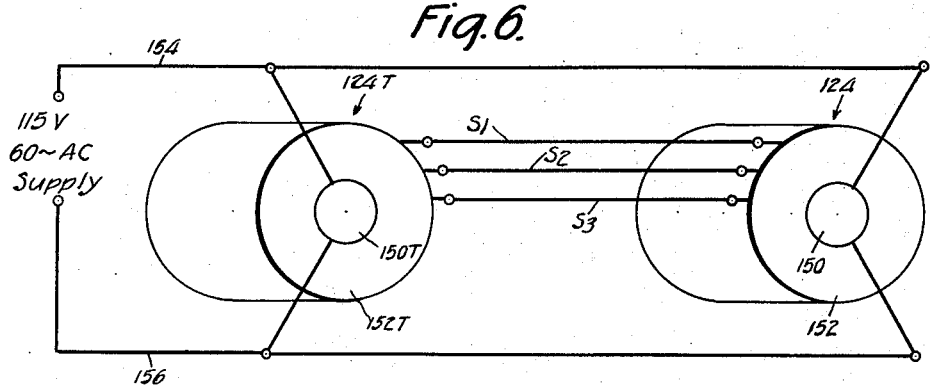
Fig. 6 is a diagrammatic view showing the impulse transmitting means for indicating roll.
Figure 5:
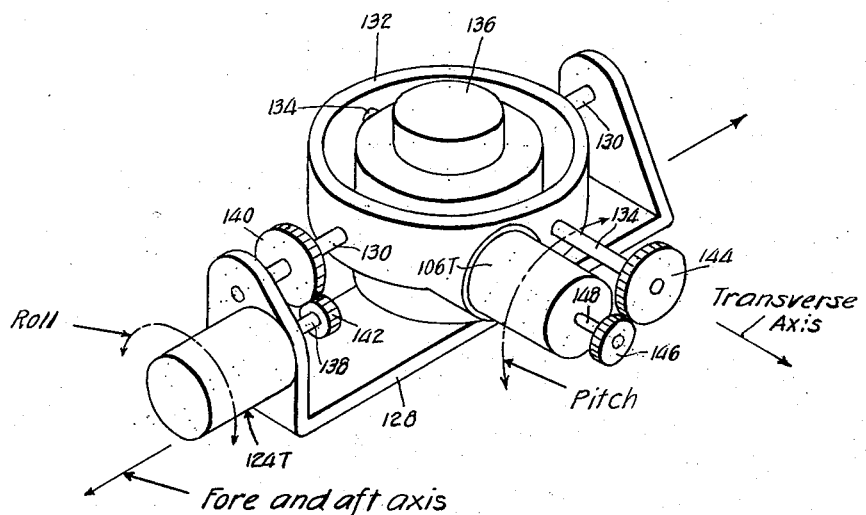
Fig. 5 is a view, largely diagrammatic, showing the mechanism whereby control impulses are originated for transmission to the control means for the artificial horizon reticle.

In Figs. 5 and 6 disclosure is made of the means for originating control impulses and transmitting them to the receiver motors 106 and 124. A fixed bracket 128 rotatably supports aligned shaft sections 130 which extend in the direction of the fore and aft axis of the airplane and which carry a ring 132. The ring 132 rotatably supports shaft sections 134. The shaft sections 134 extend in the direction of the transverse axis of the airplane and are fixed to, and support, a body 136 which is maintained in a fixed attitude by gyroscopic mechanism (not shown), which is contained within it.

A transmitter generator 124T has its stator affixed to the bracket 128 with its rotor shaft 138 disposed in parallelism with the fore and aft axis of the airplane. One of the shaft sections 130 is connected through gears 140 and 142 to the rotor shaft 138. When the airplane is banked, a relative rotary movement of the bracket 128 and the ring 132 occurs about the axis of the shaft 130 which is equal in angular extent to the amount of the bank. The gears 140 and 142 cause the shaft 138 to be rotated in the bracket through an angle which is proportional to the amount of the bank and in a direction which depends upon the direction of the bank.

The ring 132 has affixed upon it the stator of a transmitting generator 106T. One of the shaft sections 134 is connected through gears 144 and 146 to the rotor shaft 148 of the generator 106T. When the airplane is changed in attitude to point up or down, a relative rotary movement of the ring 132 and the body 136 occurs about the axis of shaft 134 which is equal in angular extent to the change of attitude of the airplane. The gears 144 and 146 cause the shaft 148 to be rotated through an angle which is proportional to the change of attitude and in a direction which depends upon the direction of the change of attitude.

Correspondence of position is automatically maintained between the rotor shaft 138 of transmitter generator 124T and the rotor shaft 126 of receiver motor 124. Correspondence of position is also automatically maintained between the rotor shaft 148 of transmitter generator 106T and the rotor shaft 108 of receiver motor 106. This is effected through follow-up mechanism which are identical in principle and construction, so that a description of one will suffice for both. The follow-up mechanism which embodies transmitter 124T and receiver 124 is shown in Fig. 6.

The transmitting generator 124T comprises a rotor 150T and a stator 152T, while the receiver motor 124, which is identical in construction with the transmitter generator 124T, comprises a rotor 150 and a stator 152. A source of alternating current supply is connected to conductor main 154 and 156. Single windings of the respective rotors 150T and 150 are connected in parallel relation between the mains 154 and 156. Each of the stators 152T and 152 includes three distinct, equiangularly related windings. The several windings of the stator having one set of corresponding ends conductively connected to one another. The opposite ends of the corresponding windings of the two stators are connected respectively through conductors $S_1$, $S_2$, $S_3$.

When the transmitter rotor 150T is in any given position, the rotor winding produces a set of three alternating output voltages. The magnitude and polarities of these three output voltages uniquely represent and identify the angular position of the transmitter rotor. The three voltages are applied to the corresponding stator windings of the receiver and cause proportional alternating current flow in the receiver stator coils. The magnetic fields thus set up by the receiver stator coils combine into a resultant field that has the same orientation with respect to the receiver stator as the composite field of the transmitter stator coils has with respect to the transmitter stator. There is then a constant torque produced between the stator field of the receiver and the rotor field of the receiver, so that the rotor shaft of the receiver is caused to orient itself until the two magnetic fields are aligned. The receiver rotor is thus maintained in substantial coincidence with the transmitter rotor as the transmitter stands at rest or as it turns in either direction.

I have described what I believe to be the best embodiments of my invention. I do not wish, however, to be confined to the embodiments shown, but what I desire to cover by Letters Patent is set forth in the appended claims.

I claim:

1. A sight unit for a vehicle in combination, a combining glass through which a subject may be viewed, a member bearing indicia representative of the horizon, optical means for directing onto said glass an image of said indicia to be viewed simultaneously with the subject, and a drive means operatively connected to said member for moving it up and down and for turning it to maintain the image of the indicia representative of the horizon in coincidence with the horizon as the vehicle pitches and rolls, said drive including parallel supporting arms pivotally connected to the reticle, a lever pivotally supporting the arms and pivotally mounted on said vehicle at a location thereon midway between the supporting pivotal locations on said vehicle, means responsive to the pitch of the aircraft for rocking the arms about its mounting with the lever at rest to move said horizon indicia in proportion to said aircraft movement to maintain the indicia in coincidence with the horizon, and means responsive to the roll of said aircraft for rocking the lever about its mounting while maintaining the arms unchanged in direction, thereby to rock the member in proportion to the amount of change of the attitude of the vehicle in relation to the horizon in order to maintain the image indicia representative of the horizon in coincidence with the horizon.

2. A sight unit for a vehicle comprising a collimating system, a fixed member bearing indicia representative of the transverse and vertical axes of the vehicle, a movable member bearing indicia representative of the horizon, said fixed and said movable members including cutout portions in alignment to permit light to pass through all of said members to thereby render said indicia visible in said collimating system, all of said indicia being disposed at substantially equal optical distances from said collimating system, said members being offset and superimposed to permit optical distance alignment of said indicia, a combining glass through which a subject may be viewed, said glass being located at the optical axis of the collimating system to receive the image of all member indicia thereon to be viewed simultaneously with the subject, means for driving said movable member up and down and for turning it about a point in a line of its indicia representative of the axis of the vehicle for maintaining the indicia representative of the horizon in coincidence with the horizon as the vehicle pitches and rolls, a light source disposed behind said indicia, a fixed vertical mirror disposed in the front of the indicia at an oblique angle to the path of the light which passes through the indicia for intercepting and reflecting the light, and a second fixed mirror disposed at a slope of substantially 45° and in the path of the reflected light for intercepting the same and reflecting it upward into the collimating system, said second mirror being disposed in parallelism with the combining glass.

3. A sight unit for a vehicle comprising a collimating system, a fixed member bearing indicia representative of the transverse and vertical axes of the vehicle, a movable member bearing indicia representative of the horizon, said fixed and said movable members including cutout portions in alignment to permit light to pass through all of said members to thereby render said indicia visible in said collimating system, all of said indicia being disposed at substantially equal optical distances from said collimating system, said members being offset and superimposed to permit optical distance alignment of said indicia, a combining glass through which a subject may be viewed, said glass being located at the optical axis of the collimating system to receive the image of all member indicia thereon to be viewed simultaneously with the subject, means for driving said movable member up and down for turning it about a point in a line of its indicia representative of the horizon in coincidence with the horizon as the vehicle pitches and rolls, a light source disposed behind said indicia, a fixed vertical mirror disposed in the path of the image of said indicia at an oblique angle to the path of the light which passes through said indicia for intercepting and reflecting light, a second fixed mirror disposed at a slope of substantially 45° and in the path of the reflected light for intercepting the same and reflecting it upwardly into the collimating system, said second mirror being disposed in parallelism with the combining glass, a tiltable semi-transparent mirror disposed between said fixed mirrors through which light passes in traveling from one to the other of the fixed mirrors, means comprising a second light and a second stationary indicia for projecting a lead angle indicia image on said semi-transparent mirror, the second stationary indicia being remote from the other indicia but located at the same focal distance from the collimating system, and means providing a universally tiltable support for the semi-transparent mirror for causing the lead indicating indicia image to be varied in its position in the combining glass relative to the fixed indicia image.

References Cited in the file of this patent

UNITED STATES PATENTS

| | | |
|---|---|---|
| 1,760,163 | Morris | May 27, 1930 |
| 1,935,740 | Gette | Nov. 21, 1933 |
| 1,980,886 | Talafre et al. | Nov. 13, 1934 |
| 2,134,932 | Smith | Nov. 1, 1938 |
| 2,197,890 | Koster | Apr. 23, 1940 |
| 2,310,446 | Langley | Feb. 9, 1943 |
| 2,395,250 | Carlson | Feb. 19, 1946 |
| 2,473,524 | Hibbard et al. | June 21, 1949 |
| 2,492,888 | Robbins | Dec. 27, 1949 |
| 2,608,001 | Barkalow | Aug. 26, 1952 |
| 2,645,150 | Robbins | July 14, 1953 |
| 2,752,684 | Bentley et al. | July 3, 1956 |

FOREIGN PATENTS

| | | |
|---|---|---|
| 776,640 | France | Nov. 8, 1934 |
| 551,880 | Great Britain | Mar. 15, 1943 |